W. O. McDANIEL.
CHERRY SEEDER.
APPLICATION FILED MAY 11, 1917.
1,235,706.
Patented Aug. 7, 1917.
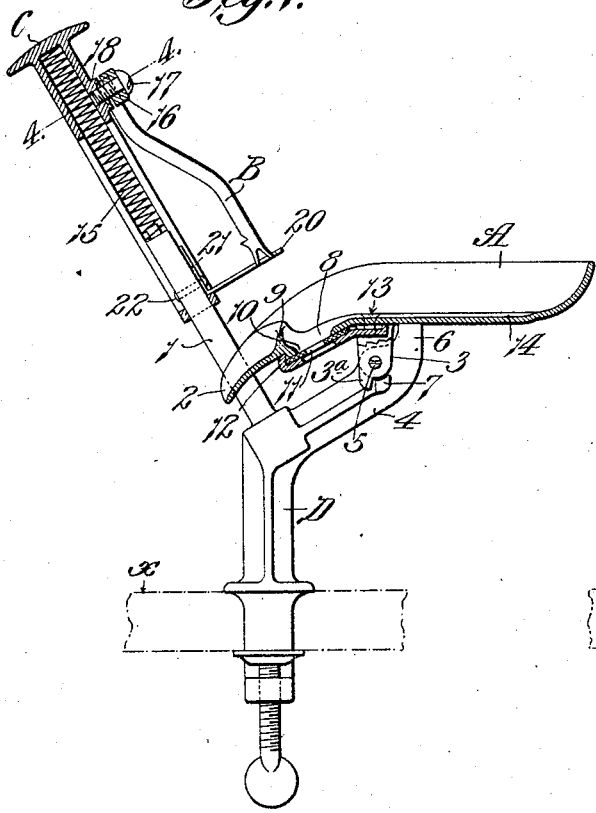
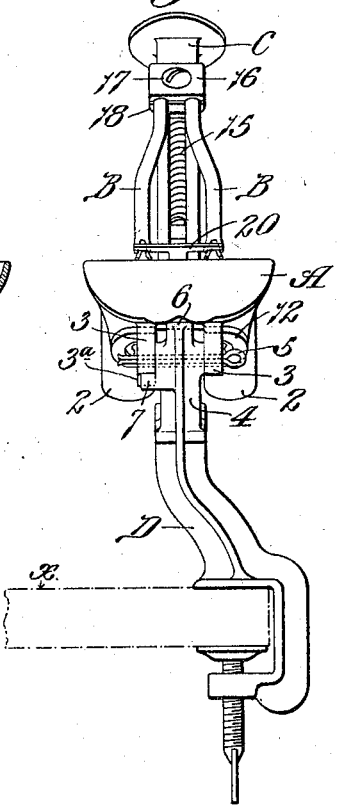
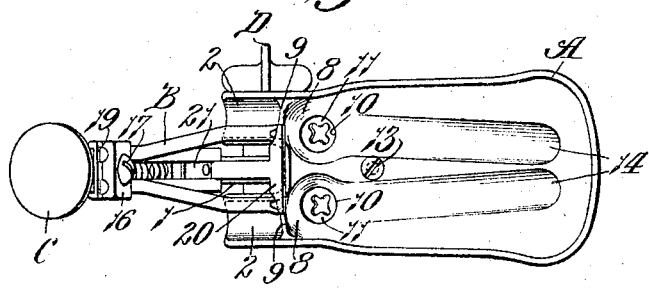
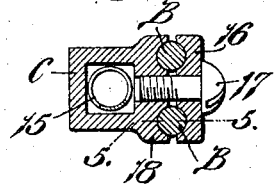
Inventor
Walter O. McDaniel.
By Bakewell Kerr attys.

UNITED STATES PATENT OFFICE.

WALTER O. McDANIEL, OF ST. LOUIS, MISSOURI, ASSIGNOR TO SCHROETER BROTHERS HARDWARE COMPANY, OF ST. LOUIS, MISSOURI, A CORPORATION OF MISSOURI.

CHERRY-SEEDER.

1,235,706.  Specification of Letters Patent.  Patented Aug. 7, 1917.

Application filed May 11, 1917. Serial No. 167,866.

*To all whom it may concern:*

Be it known that I, WALTER O. MC-DANIEL, a citizen of the United States, residing at St. Louis, Missouri, have invented a certain new and useful Improvement in Cherry-Seeders, of which the following is a full, clear, and exact description, such as will enable others skilled in the art to which it appertains to make and use the same.

This invention relates to cherry seeders, and has for its object to provide an inexpensive cherry seeder of simple design which is so constructed that the cherries will be fed automatically into position to be engaged by the seeding device without liability of becoming jammed or piled under said seeding device.

Another object is to provide a cherry seeder in which the seeding device is mounted on a spring-pressed reciprocating actuating member that is adapted to be operated by exerting downward pressure on same, said actuating member being arranged in an inclined position so as to insure the cherries falling into the discharge spout when they are stripped from the seeding device and also to enable the user's arm to occupy a natural position during the operation of forcing said actuating member downwardly.

To this end I have devised a cherry seeder in which the cherry hopper or trough that holds the unseeded cherries is so constructed and arranged that it will move at each operation of the seeding device, and thus automatically feed the cherries to the point where the seeds are forced out of same, said trough being provided at one end with a discharge spout into which the seeded cherries drop when they are stripped from the seeding device. The seeding device is mounted on a reciprocating actuating member that is arranged at one end of the cherry trough at such an angle to a horizontal plane that the user can operate same for a long period without liability of the user's arm becoming tired, the discharge spout on the cherry trough being so positioned with relation to the seeding device that the seeded cherries will be sure to strike same when they are stripped from the seeding device during the upward movement of the actuating member.

Figure 1 of the drawings is a side elevational view, partly in vertical section, of a cherry seeder constructed in accordance with my invention.

Fig. 2 is a rear elevational view of said cherry seeder.

Fig. 3 is a top plan view of same.

Fig. 4 is a sectional view, taken on the line 4—4 of Fig. 1; and

Fig. 5 is a sectional view, taken on the line 5—5 of Fig. 4, illustrating the stops on the actuating member which take up the end thrust on the seeding devices during the seeding operation.

Referring to the drawings which illustrate a cherry seeder constructed in accordance with my invention and provided with two seeding devices, A designates a cherry hopper or trough in which the unseeded cherries are placed, B designates the seeding devices and C designates the actuating member that carries said seeding devices. The cherry trough A is mounted on a support D that is adapted to be clamped or connected in any other preferred manner to a table or supporting structure $x$, and said support D is provided with a guide 1 on which the actuating member C is reciprocatingly mounted. The cherry trough A is provided at one end with two downwardly-inclined discharge spouts 2 that straddle the guide 1, previously referred to, and said trough is mounted on the support D in such a manner that the discharge end of same will tilt downwardly at each operation of the seeding devices B, and thus cause the unseeded cherries in said trough to be fed automatically into position to be engaged by the seeding devices and the seeded cherries in the spouts 2 to be discharged therefrom into a suitable receptacle (not shown) arranged beneath said discharge spouts. It is immaterial, so far as my broad idea is concerned, how the cherry hopper or trough A is mounted, so long as it will move slightly at each operation of the machine, and thus agitate the cherries in same sufficiently to tend to cause them to travel toward the point where the seeds are forced out of the cherries, but I prefer to pivotally connect the cherry hopper A to the support D in such a manner that said hopper will tilt or rock slightly at each operation of the machine. In the form of my invention herein shown the cherry hopper A is provided on its underside with depending lugs 3 that are pivotally connected to a bearing 4 on the support D by a pivot pin 5, which, if desired, can consist of a split pin or cotter key, as shown in Fig. 2, so as to enable the cherry hopper to be easily disconnected from the support D. The receiving end or right hand end of the cherry hopper A can be weighted or said hopper can be pivoted to the support D in such a manner that the main portion of said hopper that holds the bulk of said cherries normally occupies a substantially horizontal position, as shown in Fig. 1, the support D being provided with a stop 6 that bears against the bottom of the hopper A, and thus holds it normally in horizontal position. Any suitable means can be employed to limit the downward movement of the discharge end of the hopper, such, for example, as an extension 3ª on one of the lugs 3 that strikes against a lug 7 on the support D when the discharge end of the hopper tilts downwardly. The bottom of the cherry hopper curves downwardly at a point slightly in advance of the pivotal connection between said hopper and the support D, and recesses or depressions 8 are formed in said downwardly curved portion, so as to receive and hold two cherries in position to be engaged by the seeding devices B, the bottom of the hopper being provided with upwardly projecting stops or abutments 9 located at the left of said depressions 8, as shown in Figs. 1 and 3, so as to prevent the cherries from rolling out of said depressions into the discharge spouts 2. Holes 10 are formed in the bottom of the hopper A, so as to permit the seeding devices B to pass downwardly through the hopper, and thus force the seeds out of the cherries positioned in the depressions 8, and said holes are partially closed by a piece of leather 11, or other flexible material, that is perforated so as to permit the seeding devices B to pass through same, said piece of leather 11 being retained in position by means of a clamping plate 12 arranged on the underside of the bottom of the hopper and connected to same by a screw 13, or in any other suitable manner. If desired, the bottom of the hopper A can be provided with longitudinally-extending grooves 14, as shown in Fig. 3, which tend to cause the cherries to travel longitudinally of the hopper toward the recesses 8 in which the cherries are positioned during the seeding operation.

The guides 1, previously referred to, on which the actuating member C is reciprocatingly mounted, is arranged in an inclined position, as shown in Fig. 1, so that the operator's arm will not have to assume a cramped or unnatural position during the operation of forcing the actuating member C downwardly. Another advantage that results from arranging the actuating member in this manner, is that the seeded cherries are sure to strike the discharge spouts 2 when they are stripped from the seeding devices B, owing to the fact that when said seeding devices are in their elevated position, as shown in Fig. 1, they are directly above the discharge spouts 2 on the cherry hopper. The actuating member C is of tubular form and is telescoped over the guide 1, and a coiled expansion spring 15 is arranged between the upper end of said guide and the actuating member C, as shown in Fig. 1, so as to normally hold said actuating member in an elevated position, the guide 1 and tubular portion of the member C being preferably square or of non-circular shape in cross section, so as to prevent the member C from turning relatively to the guide 1. The cherry seeding devices B may be of any preferred construction and design, but said devices preferably consist of pronged members formed from round bars bent so that the pronged lower ends of same are located some distance rearwardly of the guide 1 in which the actuating member C is mounted. Said seeding devices B are preferably detachably connected to the actuating member C by means of a clamping plate 16 that is secured to the member C by a screw 17, or in any other suitable manner, said clamping plate being grooved on its inner side and the actuating member being provided with a grooved bearing 18 that receives the upper end portions of the seeding devices B that are engaged by the clamping plate 16. If desired, the grooved bearing 18 can be provided with stops 19, as shown in Fig. 5, against which the ends of the seeding devices B bear, said stops 19 taking up the end thrusts on the seeding devices during the seeding operation. A stripping device 20 is provided for stripping the cherries from the seeding devices B when said seeding devices move upwardly, said stripping device projecting rearwardly from the guide 1 and being provided at its inner end with an upwardly-projecting flange 21 through which a fastening device 22 passes, so as to secure the stripping device to the guide 1. The tubular portion of the actuating member C is slotted longitudinally so as to provide a clearance for the shank of the stripping device 20, and the lower end of the slot in one side of said member C serves as a stop that strikes against the shank of the stripping device 20, and thus limits the upward movement of the actuating member C.

In operating my improved cherry seeder the user first fills the hopper A with cherries, two of which roll downwardly into the depressions or recesses 8 in the bottom of the cherry hopper. The actuating member C is then forced downwardly by the palm of the user's hand, and when the pronged ends of the seeding devices B engage the cherries in the recesses 8, they force the seeds out of the cherries through the alined holes in the bottom of the hopper A and in the plate 12 on the underside of the hopper, the downward movement of the seeding devices exerting sufficient downward pressure on the discharge end of the hopper A to tilt same downwardly, and thus cause two other cherries in the hopper to roll downwardly into position to drop into the depressions 8 when the seeding devices move upwardly. On the upward movement of the actuating member C the two seeded cherries which are still clinging to the seeding devices will be stripped from said devices by the stripper 20, said seeded cherries falling downwardly into the discharge spouts 2, from which they thereafter escape into the receptacle arranged beneath said discharge spouts. In a cherry seeder of the construction above described there is no liability of the cherries becoming jammed or piled under the seeding devices, nor is there any liability of the cherries sticking in the hopper and failing to travel into position to engage the seeding devices, owing to the fact that the hopper A is so arranged that the main portion of same normally occupies a substantially horizontal position, and at each operation of the seeding devices said hopper is tilted or rocked sufficiently to cause the cherries in same to be agitated or moved toward the discharge end of the hopper. Such a cherry seeder is of such simple design that it can be manufactured at a low cost; it can be taken apart easily for cleaning and the actuating device of same is so arranged that it can be operated for a long period without tiring the user's arm.

Having thus described my invention, what I claim, and desire to secure by Letters Patent, is:

1. A cherry seeder, comprising a pivotally mounted cherry hopper or trough provided at one end with a downwardly-inclined discharge spout, a depression or recess formed in the bottom of said trough at the receiving end of said discharge spout for holding a cherry, and a seeding device arranged so that it will engage the cherry in said recess and simultaneously rock or tilt said trough so as to agitate the cherries in same.

2. A cherry seeder, comprising a cherry hopper or trough having a main portion that normally occupies a substantially horizontal position, said trough being pivotally mounted, and a reciprocating actuating member arranged in an inclined position with relation to said trough and provided with a seeding device that is adapted to engage a cherry in said trough and force the seed out of said cherry, the movement of said seeding device causing said trough to rock or tilt in a direction tending to feed the cherries in said trough into seeding position.

3. A cherry seeder, comprising a support that is adapted to be connected to a supporting structure, a cherry hopper or trough pivotally mounted on said support and provided at one end with a downwardly-inclined discharge spout, an inclined guide on said support, a spring-pressed actuating member reciprocatingly mounted on said guide, and a seeding device on said actuating member arranged in such a manner that a seeded cherry that is stripped from same during the upward movement of said actuating member will fall into said discharge spout.

4. A cherry seeder, comprising a support that is adapted to be connected to a supporting structure, a cherry hopper or trough pivotally mounted on said support and provided at one end with a downwardly-inclined discharge spout, an inclined guide on said support, a spring-pressed actuating member reciprocatingly mounted on said guide, a seeding device on said actuating member arranged in such a manner that a seeded cherry that is stripped from same during the upward movement of said actuating member will fall into said discharge spout, means on said support that normally holds said trough in substantially horizontal position, and means for limiting the tilting movement of said trough during the seeding operation.

5. A cherry seeder, comprising a support that is adapted to be connected to a supporting structure, a cherry hopper or trough pivotally mounted on said support and provided on one end with a downwardly-inclined discharge spout, the bottom of said trough being provided with a depression or recess for receiving and holding a cherry in seeding position, an inclined guide on said support of non-circular shape in cross section, a tubular-shaped actuating member reciprocatingly mounted on said guide and normally held in an elevated position by means of a spring arranged between same and the upper end of said guide, a seeding device on said actuating member arranged so that it will engage the cherry held in the recess in said trough when said actuating member is moved downwardly and forces the seed in said cherry through a hole in said trough, means for limiting the upward movement of said actuating device, and means for limiting the rocking movement of said cherry trough in opposite directions.

6. A cherry seeder provided with a cherry hopper or trough, a reciprocating actuating member provided with a seeding device, a bearing on said member provided with a stop against which one end of said seeding device bears, and a clamping plate for securing said seeding device to said actuating member.

WALTER O. McDANIEL.

Copies of this patent may be obtained for five cents each, by addressing the "Commissioner of Patents, Washington, D. C."